United States Patent [19]

Seta et al.

[11] Patent Number: 5,453,947
[45] Date of Patent: Sep. 26, 1995

[54] CACHE MEMORY SYSTEM

[75] Inventors: Katsuhiro Seta, Tokyo; Hiroyuki Hara, Fujisawa, both of Japan

[73] Assignee: Kabushiki Kaisha Toshiba, Kawasaki, Japan

[21] Appl. No.: 12,907

[22] Filed: Feb. 3, 1993

[30] Foreign Application Priority Data

Feb. 5, 1992 [JP] Japan .................................. 4-019320

[51] Int. Cl.⁶ .................................................. G11C 15/00
[52] U.S. Cl. ........................................ 365/49; 365/189.07
[58] Field of Search ............................... 355/49, 189.01, 355/177; 395/425; 365/189.07

[56] References Cited

U.S. PATENT DOCUMENTS

| 4,219,883 | 8/1980 | Kobayashi et al. | 365/49 X |
| 5,218,567 | 6/1993 | Suzuki et al. | 365/49 X |
| 5,253,197 | 10/1993 | Suzuki et al. | 365/49 |
| 5,267,190 | 11/1993 | Easley et al. | 365/49 |

OTHER PUBLICATIONS

Kurita, K., et al., "Study of BiCMOS Cache Memory", Trans. IEICE, J71-C, pp. 1442-1449 (Oct. 1988) (In Japanese).

Primary Examiner—Joseph A. Popek
Assistant Examiner—Son Dinh
Attorney, Agent, or Firm—Spensley Horn Jubas & Lubitz

[57] ABSTRACT

A tag section of a cache memory system comprises a memory for storing a plurality of first address data read out with a small amplitude (e.g., 0.2 Vpp), a circuit for comparing a plurality of second address data, input from the outside of the system, with the plurality of first address data, and providing comparison results with a second amplitude (e.g., 0.8 vpp), an OR logic circuit including a plurality of bipolar transistors having bases to which the comparison results are respectively supplied, collectors connected to a first voltage source, and emitters which are all connected to an emitter dot line, and a circuit for measuring the potential of the emitter dot line by using a reference voltage to determine that all the first and second data coincide with each other. Since a read operation with respect to each tag memory and most hit detecting operations are performed with small-amplitude signals of the ECL level, a high-speed operation can be performed.

7 Claims, 3 Drawing Sheets

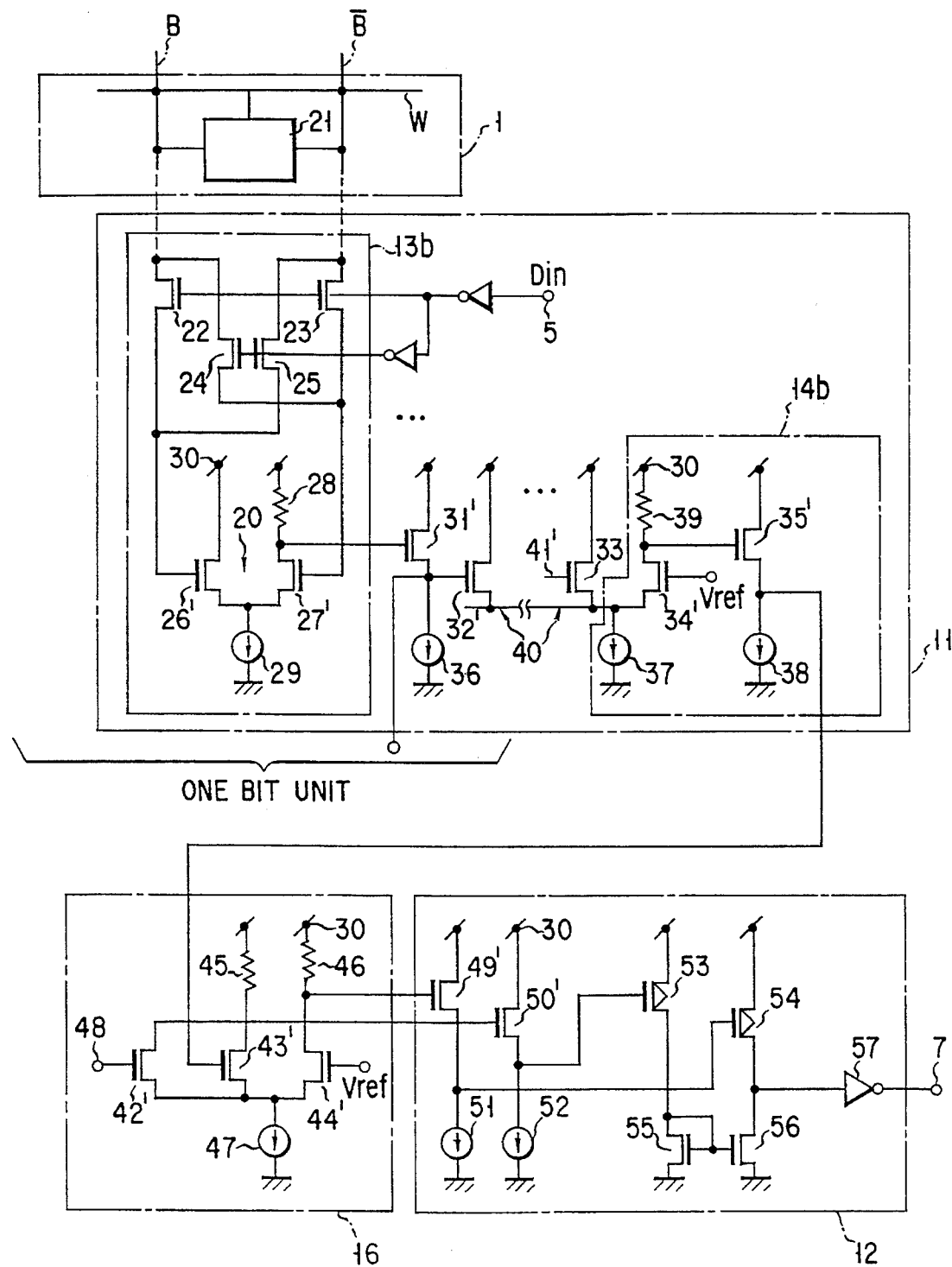
F I G. 3

CACHE MEMORY SYSTEM

BACKGROUND OF THE INVENTION

1. Field of the Invention

The present invention relates to a cache memory system in which a portion, of a cache memory, for obtaining a hit signal is improved.

2. Description of the Related Art

In general, a cache memory is constituted by a high-speed memory such as an SRAM, whereas a main memory is constituted by a relatively low-speed, large-capacity memory such as a DRAM. Of the data stored in the main memory, data which are used at high frequencies are also stored in the cache memory. Therefore, frequently used data are read out from the cache memory at high speed. Consequently, the total throughput of the system can be improved by using the cache memory.

A cache memory is generally constituted by a tag section for performing address detection, and a data section in which desired data is stored. The present invention is associated with the tag section.

In conventional cache memory system, a small amplitude signal read out from a memory core portion of the tag section is amplified first to the CMOS level by a sense amplifier. An address or index corresponding to an address in the main memory is stored in this memory core portion. The amplified signal is then compared with a signal (address), transmitted from a CPU, by a CMOS level comparator so as to determine whether the two signals coincide with each other. This determination result is input, as a tag match signal (corresponding to a hit signal, specifically a signal at a stage prior to the generation of a hit signal), to a hit logic. In the hit logic, a logical operation of the input tag match signal and a control bit signal is performed in a range of CMOS level. As a result, a hit signal is generated. For example, this control bit signal serves to invalidate the match signal when one data stored at one address in the main memory is different from the data stored at the corresponding address in the cache memory. A control bit signal is recorded as an attribute of each index stored in the memory core portion.

In the conventional cache memory system described above, a signal is amplified to the CMOS level (a full swing in the power-supply voltage range) by the sense amplifier, and is subsequently processed by the comparator and the hit logic. Therefore, the delay time before a hit signal is generated is determined by the operating speed (low speed because of a large amplitude) of a CMOS logic, and the number of gates through which a signal passes. In the CMOS logic, a high-speed, multi-input logical OR for hit detection is difficult to realize in terms of arrangement. In addition, if circuits such as a comparator and a hit logic are arranged by using long wires, the electrical wiring capacitance causes an increase in signal transfer delay time in the CMOS logic which handles a large-amplitude signal.

SUMMARY OF THE INVENTION

It is an object of the present invention to provide a cache memory system which can obtain a hit signal at high speed.

In order to achieve the above object, according to the present invention, there is provided a cache memory system having a tag section for performing address detection, and a data section for storing data corresponding to the address, the tag section comprising:

a memory for storing a plurality of first data read out with an first amplitude smaller than that of a power supply voltage of the system;

a circuit for comparing a plurality of second data input from the outside of the system with the plurality of first data and providing each comparison result with a second amplitude smaller than that of the power supply voltage;

an OR logic circuit having a plurality of bipolar transistors, the bipolar transistors having bases to which the comparison results are respectively supplied, collectors connected to a first voltage source, and emitters which are all connected to an emitter dot line; and a circuit for measuring a potential of the emitter dot line by using a reference voltage to determine that all the first and second data coincide with each other.

That is, according to the present invention, since most operations from a read operation with respect to tag memory to hit detection operations can be performed with small-amplitude signals of, e.g., the ECL (emitter coupled logic) level, a high-speed operation can be performed. In addition, since a parallel circuit of transistors can be easily formed when an multi-input OR logical operation is performed, the design of a high-speed logic circuit is greatly facilitated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIG. 3 is a circuit diagram showing the agreement of a circuit using MOS FETs, which circuit is equivalent to that shown in FIG. 2.

DETAILED DESCRIPTION OF THE PREFERRED EMBODIMENTS

Figure 1:
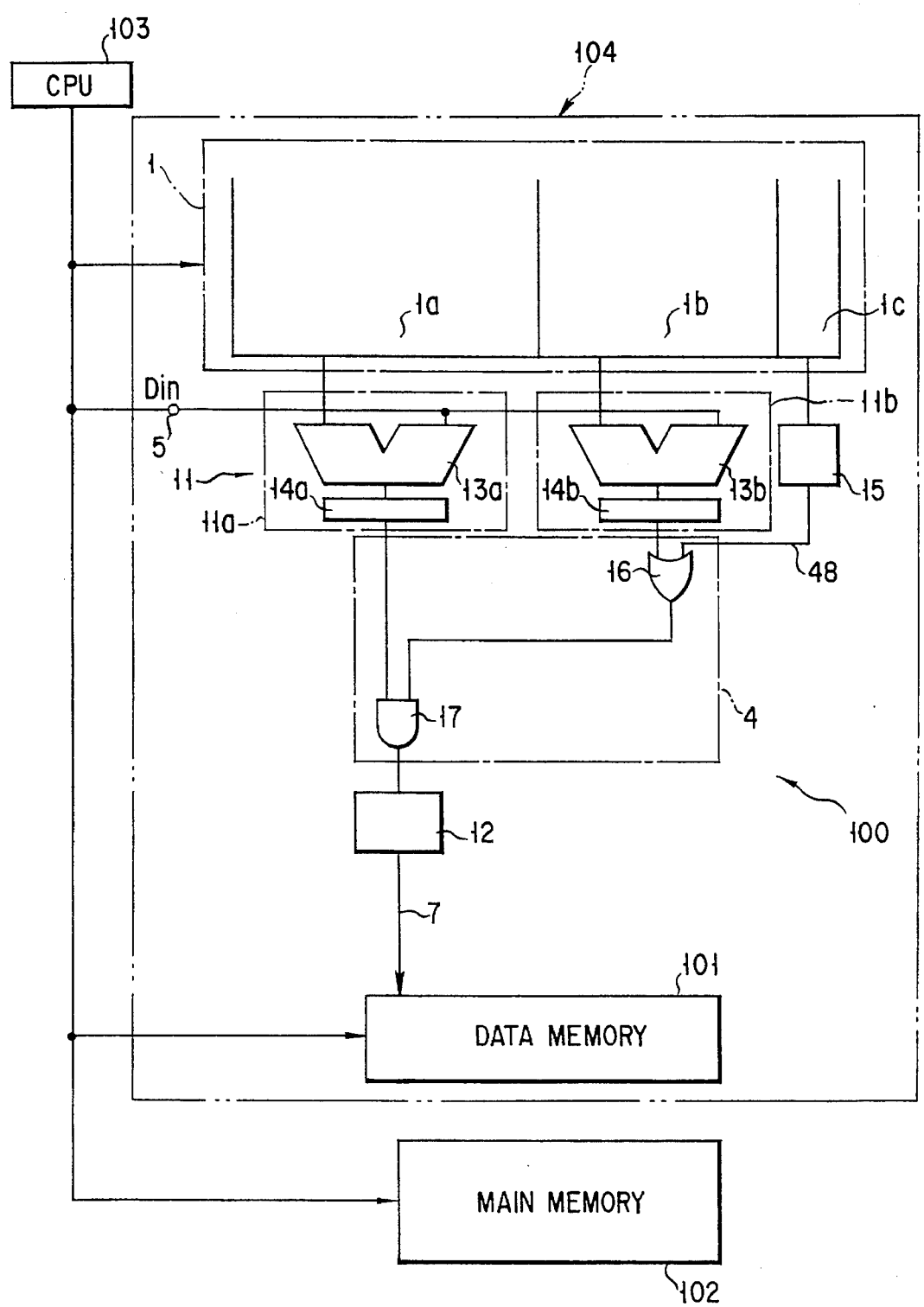
FIG. 1 is a block diagram showing the circuit arrangement of an embodiment of the present invention.

Embodiment of the present invention will be described below with reference to the accompanying drawings. FIG. 1 is a block diagram of a circuit arrangement showing an outline of a system according to the present invention.

The circuit arrangement shown in FIG. 1 includes a CPU (central processing unit) 103 for controlling the overall system, a main memory 102 constituted by a large-capacity DRAM or the like, and a cache memory 104. The cache memory 104 is constituted by a tag section 100 for performing address detection, and a data memory section 101 for storing desired data of the data stored in the main memory 102, i.e., data which are used at relatively high frequencies. The tag section 100 according to the present invention includes a memory core portion 1 for storing data representing the storage locations of the desired data at the main memory 102, a small-amplitude level comparator 11, an ECL level hit logic 4 for performing a logical operation of a tag match signal (address match signal) and a control signal from a control bit 1c, and a converter 12 for performing ECL/CMOS level conversion.

The small-amplitude level comparator 11 compares a small-amplitude (first amplitude) signal (e.g., 0.2 vpp) read out from the tag memory 1 with an address signal Din (e.g., CMOS amplitude level) sent from the CPU 103, while the amplitude of the small-amplitude signal is kept unchanged, thus outputting a tag match signal having an ECL level amplitude (second amplitude). For example, a circuit 11a is on the upper address bit side; and a circuit 11b, on the lower address bit side. The circuits 11a and 11b respectively include comparators 13a and 13b, and ECL level bit detecting OR circuits 14a and 14b.

A circuit 15 is a circuit for reading out the control signal 1c from the memory 1, and outputting it as a signal having an ECL level amplitude (third amplitude) (e.g., 0.8 vpp). A circuit 16 is an OR circuit for determining whether to invalidate, e.g., a lower address bits comparison result. A circuit 17 is an AND circuit for obtaining an ECL-level hit signal by performing a logical operation of signals from the circuits 14 and 16. The circuit 12 is a circuit for converting the ECL-level signal, supplied from the AND circuit 17, into a CMOS-level amplitude signal.

Figure 2:
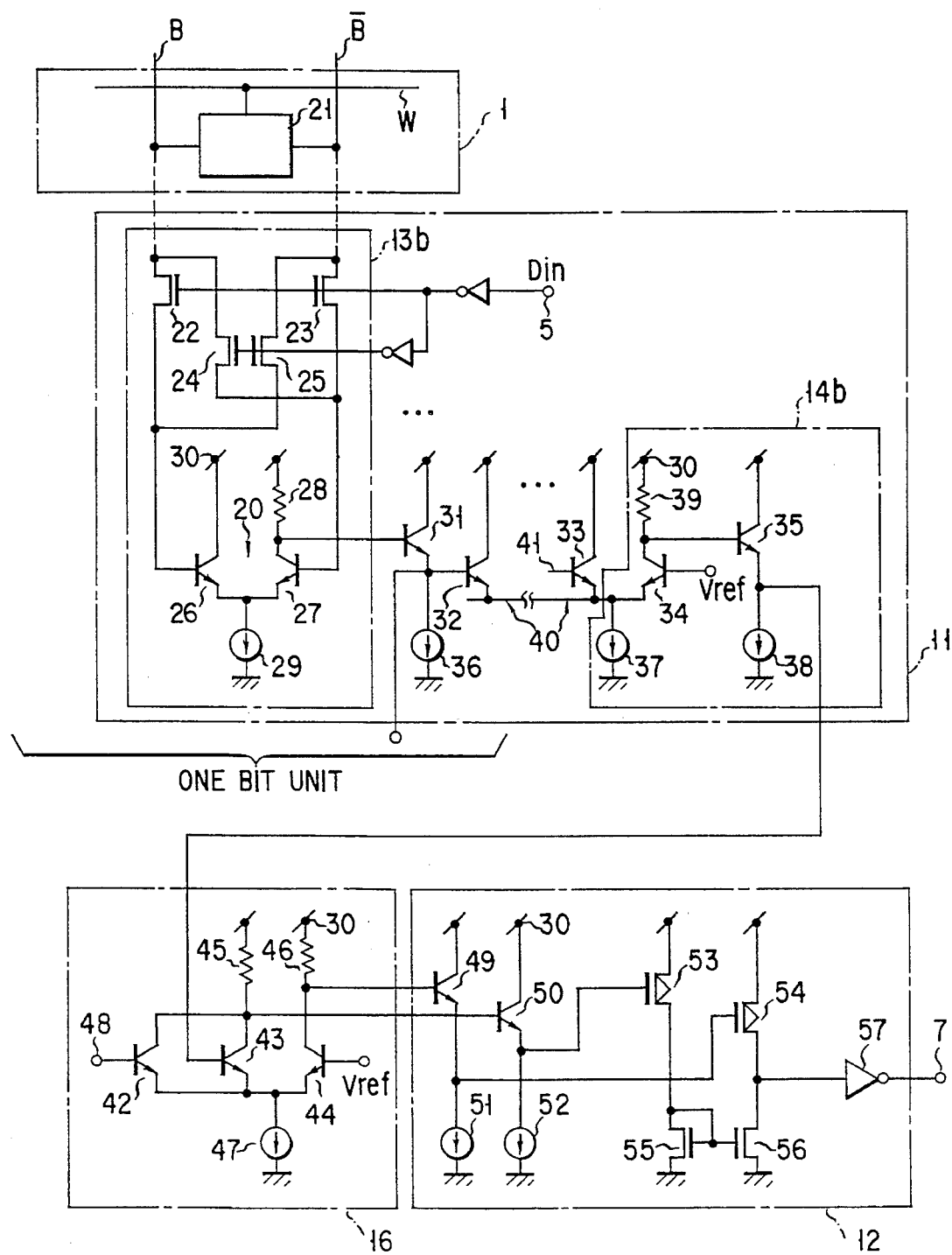
FIG. 2 is a circuit diagram showing a detailed arrangement of the first embodiment in FIG. 1.

FIG. 2 is a circuit diagram of a detailed circuit arrangement of the circuit in FIG. 1, showing only lower address bits. In this case, a circuit 21 is a memory cell, in which one bit of the above-mentioned lower address bits is stored. Reference symbols B, $\bar{B}$, and W denote a bit line, an inverted bit line, and a word line, respectively.

The comparator 13b compares the data Din input from the CPU 103 with the data in the memory cell 21 to detect whether the two data coincide with each other. The comparator 13b comprises transfer gates 22 to 25, npn transistors 26 and 27, a resistor 28, a constant current source 29, and a power supply 30 (e.g., 3.3 to 5 V). A circuit 20 constitutes a sense amplifier.

A transistor 31 constituted by emitter follower, performs level conversion and current amplification of an output from the comparator 13b. The transistor 31 allows the comparison results for each bit, obtained by the comparator 13b to be transmitted outside the cache memory.

Since one address (index) of the cache memory is constituted by a plurality of bits, the transistors 32, ..., 33 are arranged in parallel according to the corresponding number of bits, as indicated by the dots in FIG. 2, and constitute a emitter dot line 40. More specifically, the memory cells 21, the comparators 13b, and the bipolar transistors 32 and 31 constituted by emitter followers are respectively arranged according to the number of bits, as indicated by the other dots in FIG. 2. The transistors 32, ..., 33 and the emitter dot line 40 constitute a current switch OR circuit. That is, if at least one of emitter outputs from the transistors 31 arranged for the respective bits is at logic "1", the emitter dot line 40 is set at logic "1". The ECL level bit detecting OR circuit 14b measures the potential of the emitter dot line 40 by using a reference voltage vref, and determines whether all the data stored in a plurality of memory cells 21 and a plurality of data Din from the CPU 103 coincide with each other. The ECL level bit detecting OR circuit 14b is constituted by npn transistors 34 and 35, constant current sources 37 and 38, and a resistor 39. Reference symbol Vref denotes a reference voltage compared with the base potential of each of the transistors 32, ..., 33. Each base (denoted by a reference numeral 41) of the transistors 32 ..., 33 receives an OR logical input from a corresponding address bit (memory cell 21) through a corresponding comparator (13b).

The OR circuit 16 is constituted by transistors 42 to 44, resistors 45 and 46, and a constant current source 47. Logical inputs are respectively supplied to the bases of the transistors 42 and 43. Reference numeral 48 corresponds to the output portion of the converter 15 in FIG. 1. Reference symbol Vref denotes a reference voltage compared with each logical input. The ECL-CMOS level converter 12 is constituted by bipolar transistors 49 and 50, constant current sources 51 and 52, p-channel MOS FETs 53 and 54, n-channel MOS FETs 55 and 56 having a current mirror arrangement, and an inverter 57. In this case, the bipolar transistor circuit portion performs a swing operation at an intermediate level close to the ECL level, and the CMOS FET circuit portion performs a full-swing operation around the power supply voltage at in a range of the CMOS level.

An operation of the circuit having the above-described arrangement now will be described. A small-amplitude signals read out from the tag memory cell 21 are compared with the address data (index data) Din supplied from the CPU 103 passing the signals through the transfer gate 22 to 25 controlled by the address data Din. The comparison result of the ECL level is output, which is obtained by inputting the signals passed through the transfer gates, to the base of each of the transistors 26 and 27 constituting a differential pair. If, for example, the output data in the memory cell 21 which is controlled by the word line W of the memory cell 21 is at logic-"1" (high level), the potential of the bit line B becomes higher than that of the inverted bit line by about 0.2 V. In this case, if a logic-"1" signal is input as the address signal Din, the transfer gates 24 and 25 are turned on, the transistors 26 and 27 as the differential pair are turned off and on, respectively, and a low-level signal of the ECL level is generated by the comparator 13b.

In contrast, if a logic-"0" signal is input as the address signal Din, the transfer gates 22 and 23 are turned on, the transistors 26 and 27 are turned on and off, respectively. In this case, a high-level signal of the ECL level is output from the comparator 13b.

If the data read out from the cell 21 is "0", the potential of the inverted bit line $\bar{B}$ becomes higher than that of the bit line B. Similarly, in this case, upon a switching operation by the transfer gates 22 to 25, the comparison result output from the comparator 13b is set at low level when the signal Din is at "0" level, and is set at high level when the signal Din is at "1" level.

That is, the comparator 13b outputs an ECL level comparison result of low level when the data in the cell 21 and the data Din coincide with each other, but outputs an ECL level comparison level of high level when the two data do not coincide with each other.

A comparison result output from each address bit is level-shifted and current-amplified by the transistor 31 for each bit. With this operation, a comparison result can be read from the outside of the cache memory, for each of the bits, if required for the arrangement of the system. Furthermore, the comparison results for all the bits are input to the emitter dot line connected to the emitters of the transistors 32, ..., 33, and a tag match signal is generated by the ECL level bit detecting OR circuit 14b. That is, the output from the circuit 14b is set at low level only when the data in all the cells (corresponding to respective cells 21) and the respective data Din coincide with each other, i.e., all the bases of the transistors 32, ..., 33 are at low level.

In the ECL level hit logic 16, a logical operation is performed with respect to a control signal (signal from the terminal 48) indicating invalidity/validity of the tag match signal (associated with only the lower address bit side, in this case) and the match signal, thereby obtaining a final hit signal having a small amplitude. The level of this hit signal is converted from the ECL level to the CMOS level by the converter 12. As a result, the hit signal of the CMOS level is obtained from the output terminal.

The circuit shown in FIG. 3 uses MOS FETs (metal-oxide semiconductor field effect transistors) in place of the bipolar transistors in FIG. 2 to realize the same function as that of the circuit in FIG. 2. Although the MOS FETs corresponding to the bipolar transistors in FIG. 2 are denoted by the same reference numerals as those denoting the bipolar transistors, (') is added to reference numerals denoting the MOS FETs.

In the cache memory system having the above-described arrangement, since most operations are performed by using a low intermediate level signal (the ECL level in this case) of ¼ or less of the power supply voltage, i.e., by using a small-amplitude signal, and are performed through the current switch 16 constituted by bipolar transistors and the like, a high-speed operation is ensured. In addition, even if the wiring length at the comparator 13b and the hit logic portion is long, since an operation is based on a small-amplitude signal, influence of the wiring capacitance on the operating speed is small. Furthermore, since logical operations are performed by the ECL scheme, an ECL technique such as a multi-level logical operation can be used, and the operating speed can be increased by reducing the number of gates. Moreover, since a parallel circuit of bipolar transistors is used for the OR circuit (emitter dot line) 40, the number of logical inputs can be easily increased, facilitating the design of a logic circuit.

The present invention is not limited to the embodiment and can be variously applied. For example, in the embodiment, the operation in a range of the ECL level is described. However, the same effects can be obtained even by using arbitrary signal levels and amplitudes within the range in which logical operations can be performed by the ECL scheme. In addition, in the circuit shown in FIG. 1, an address is divided into upper and lower address bits, and the technique of invalidating/validating the lower address bits is employed. However, the present invention is varied depend on system architecture. In short, the present invention is not limited to the circuits shown in FIGS. 1, 2, and 3, and can employ various circuit arrangements. Furthermore, the term "third amplitude" is used to indicate that the present invention is not limited to the second amplitude.

What is claimed is:

1. A system including a CPU, a main memory, and a cache memory, said cache memory comprising:

means for storing desired data items in said main memory;

means for storing a plurality of first data items indicating a storage location of the desired data items, the first data items being read out with a first amplitude smaller than that of a power supply voltage of said cache memory;

means for detecting coincidence between each of second data items, input through said CPU, and a corresponding one of the first data items, and outputting each detection result with a second amplitude:

means, including a plurality of first bipolar transistors, for respectively current-amplifying a plurality of signals output from said coincidence detecting means with emitter follower arrangements:

a plurality of second bipolar transistor means having bases to which outputs from said current amplifying means are respectively supplied, collectors connected to a first voltage source, and emitters which are all connected to an emitter dot line; and means for comparing a base potential of each of said second bipolar transistors with a reference potential to determine that all the first and second data coincide with each other, said comparing means including third bipolar transistor having a collector connected to said first voltage source through a resistor, an emitter connected to said emitter dot line and a constant current source, and a base to which a reference voltage used to determine said base potential is applied, and the collector of said third bipolar transistor generating a hit signal indicating that all the first data items coincide with all second data items.

2. A system including a CPU, a main memory, and a cache memory, said cache memory comprising:

means for storing desired data items in said main memory;

means for storing a plurality of first data items indicating a storage location of the desired data items, the first data items being read out with a first amplitude smaller than that of a power supply voltage of said system;

means for detecting coincidence between each of second data items, input through said CPU, and a corresponding one of the first data items, and outputting each detection result with a second amplitude;

a plurality of first MOS FETs having gates to which outputs from said detecting means are respectively supplied, drains connected to a first voltage source, and sources which are all connected to a single common line; and means for comparing a gate potential of each of said first MOS FETs with a reference voltage to determine that all the first and second data coincide with each other, said comparing means including a third MOS FET having a drain connected to said first voltage source through a resistor, a source connected to said common line and said constant current source, and a gate to which a reference voltage used to determine said gate potential is applied, the drain of said third MOS FET generating a hit signal indicating that all the first data items coincide with all second data items.

3. A cache memory according to claim 2, further comprising means, constituted by a plurality of second MOS FETs having a source follower arrangement, for current amplifying each of a plurality of signals output from said means for detecting coincidence.

4. A cache memory system having a tag section for performing address detection, and a data section for storing data corresponding to the address, said tag section comprising:

means for storing a plurality of first data items read out with a first amplitude smaller than that of a power supply voltage of said system;

means for comparing a plurality of second data items input from the outside of said system with the plurality of first data items and providing each comparison result with a second amplitude;

OR logic means having a plurality of bipolar transistors, said bipolar transistors having bases to which the comparison results are respectively supplied, collectors connected to a first voltage source, and emitters which are all connected to an emitter dot line; and means for measuring a potential of said emitter dot line by using a reference voltage to generate a hit signal indicating that all the first data items coincide with all second data items respectively, wherein said storage means further stores a third data item controlling an output from said hit signal generating means, the third data item is read out with the first amplitude, and said system further comprises means for converting the third data item into a signal having a third amplitude, and hit logical operation means for performing a logical operation by using an output from said converting means and an output from said hit signal generating means.

5. A system according to claim 4, wherein at least said hit signal generating means and said hit logical operation means are ECL (emitter coupled logic) gates.

6. A cache memory system having a tag section for performing address detection, and a data section for storing data corresponding to the address, said tag section comprising:

means for storing a plurality of first data items read out with a first amplitude smaller than that of a power supply voltage of said system;

means for comparing a plurality of second data items input from the outside of said system with the plurality of first data items and providing each comparison result with a second amplitude;

OR logic means having a plurality of bipolar transistors, said bipolar transistors having bases to which the comparison results are respectively supplied, collectors connected to a first voltage source, and emitters which are all connected to an emitter dot line; and means for measuring a potential of said emitter dot line by using a reference voltage to generate a hit signal indicating that all the first data items coincide with all second data items respectively, wherein said measuring means comprises a bipolar transistor, said transistor having an emitter connected to said emitter dot line and a constant current source, a base to which the reference voltage is applied, and a collector which is connected to said first voltage source through a resistor, wherein said transistor generates the hit signal.

7. A cache memory system having a tag section for performing address detection, and a data section for storing data corresponding to the address, said tag section comprising:

means for storing a plurality of first data items read out with a first amplitude smaller than that of a power supply voltage of said system;

means for comparing a plurality of second data items input from the outside of said system with the plurality of first data items and providing each comparison result with a second amplitude;

OR logic means comprising a plurality of first bipolar transistors with an emitter follow arrangement for current-amplifying each of a plurality of comparison results output from said comparison means, and a plurality of second bipolar transistors having bases to which the comparison results are respectively supplied, collectors connected to a first voltage source, and emitters which are all connected to an emitter dot line; and means for measuring a potential of said emitter dot line by using a reference voltage to generate a hit signal indicating that all the first data items coincide with all second data items respectively.

* * * * *